Oct. 2, 1923.
W. C. PALMER
1,469,240
DEVICE FOR TESTING THE RECUPERATIVE POWER IN A GUN
Filed March 22, 1922
3 Sheets-Sheet 1
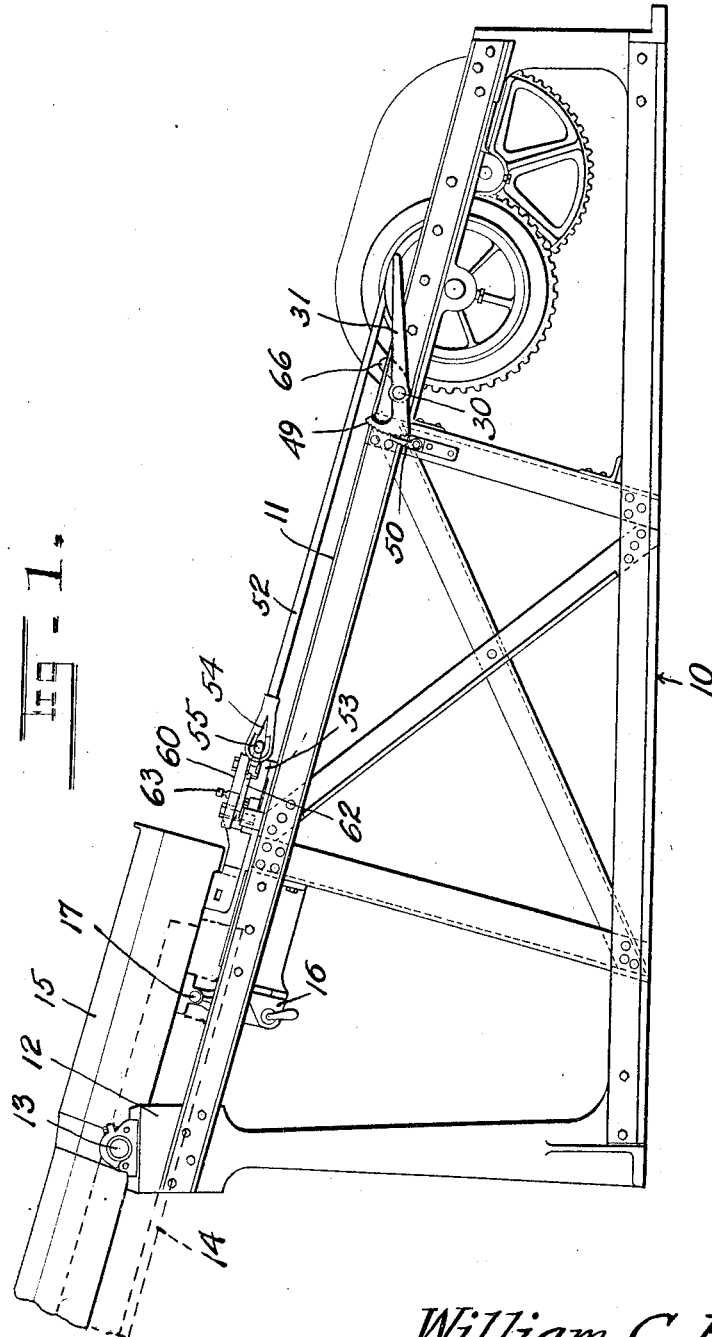
INVENTOR.
William C. Palmer
By W. M. Roach
Attorney.

Oct. 2, 1923.
W. C. PALMER
1,469,240
DEVICE FOR TESTING THE RECUPERATIVE POWER IN A GUN
Filed March 22, 1922     3 Sheets-Sheet 2
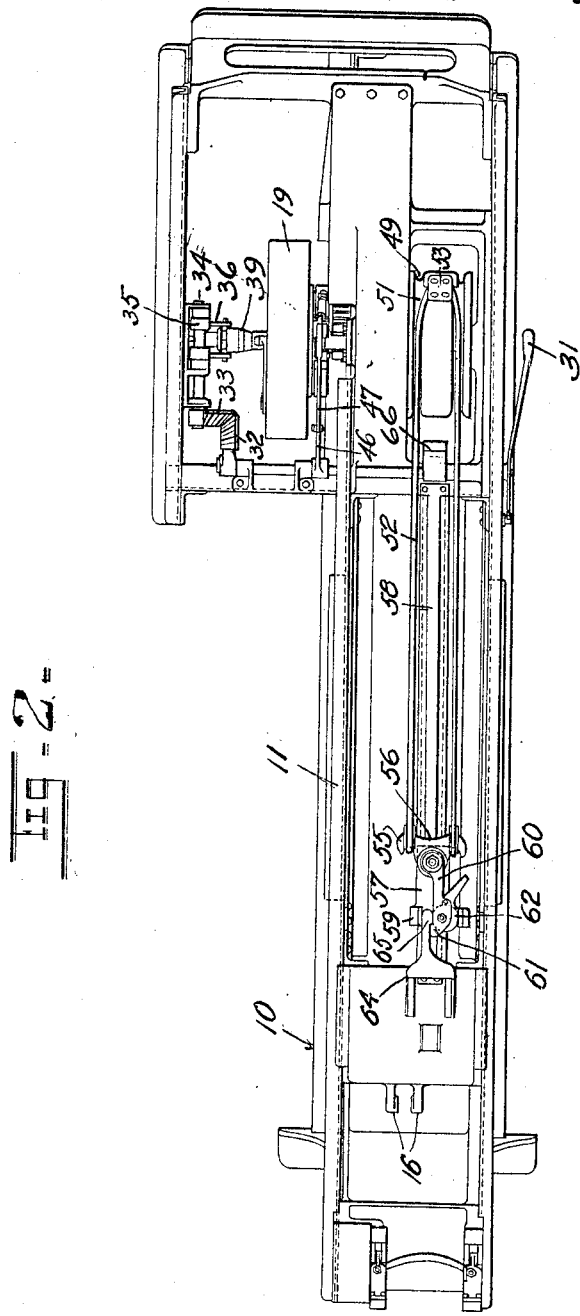
INVENTOR.
William C. Palmer
By W. N. Roach,
Attorney

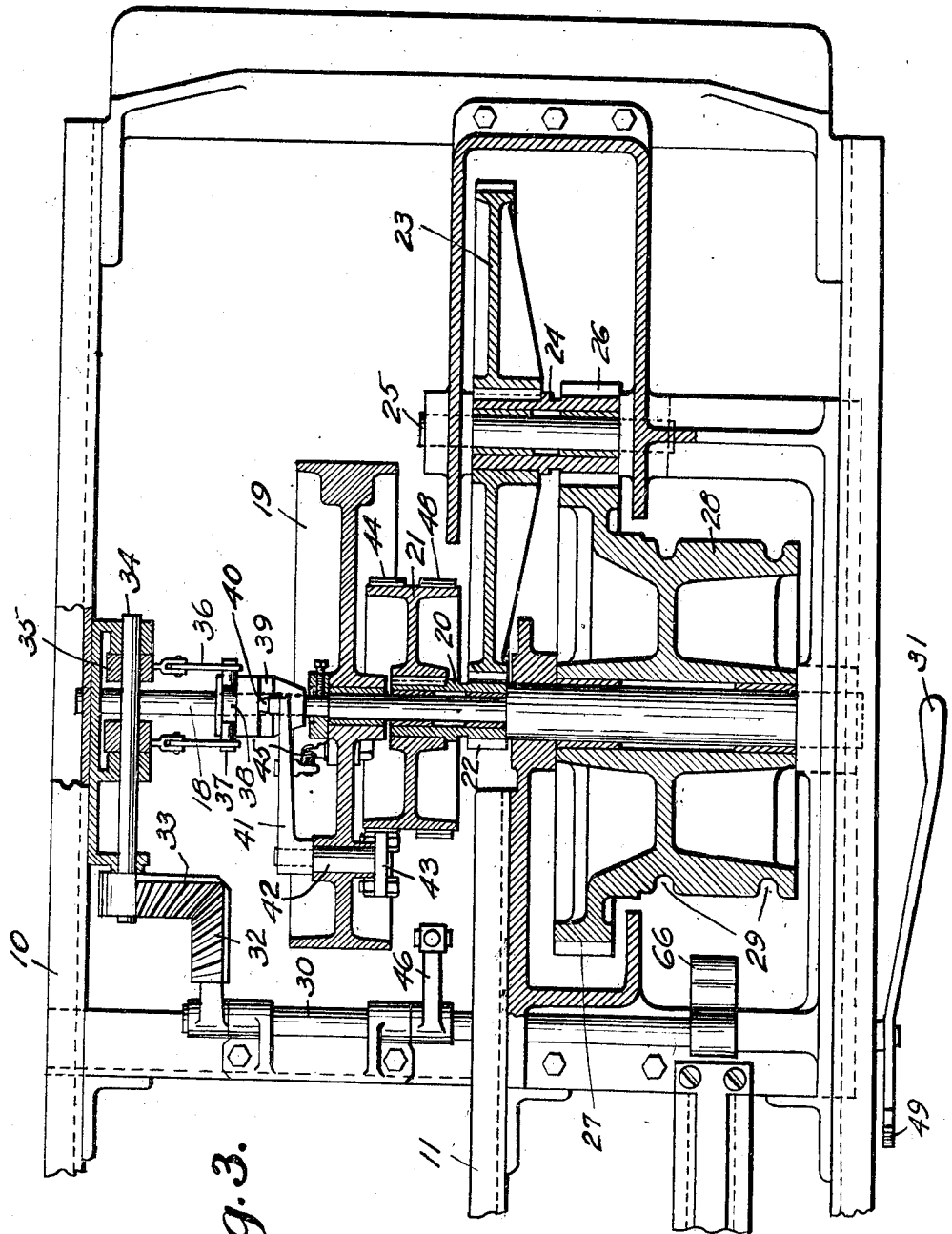

Patented Oct. 2, 1923.

1,469,240

UNITED STATES PATENT OFFICE.

WILLIAM C. PALMER, OF DAVENPORT, IOWA.

DEVICE FOR TESTING THE RECUPERATIVE POWER IN A GUN.

Application filed March 22, 1922. Serial No. 545,910.

(FILED UNDER THE ACT OF MARCH 3, 1883, 22 STAT. L., 625.)

*To all whom it may concern:*

Be it known that I, WILLIAM C. PALMER, a citizen of the United States, and a resident of Davenport, county of Scott, and State of Iowa, have invented an Improvement in a Device for Testing the Recuperative Power in a Gun, of which the following is a specification.

The invention described herein may be used by the Government, or any of its officers or employees in prosecution of work for the Government, or by any other person in the United States, without payment to me of any royalty thereon.

The subject of this invention is a device for testing the recuperative power in a gun. When a gun is fabricated and assembled on its cradle it is desirable to know the force developed in the recuperator; the ability of the recuperator to restore the gun to battery and the rapidity with which such restoration is accomplished.

My invention is designed to provide a testing device from which the desired information may be conveniently and accurately secured.

With the foregoing and other objects in view, my invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawings, wherein:

Fig. 1 is a side elevation of a testing device constructed in accordance with the invention;

Fig. 2 is a projection of same upon a plane parallel to the top surface of the structure; and Fig. 3 is an enlarged detailed, fragmentary view, partly in section, of the operating mechanism.

In carrying out my invention I provide means for mounting a gun and its cradle in a manner similar to that employed on its carriage; means for retracting the gun; means for holding it in any retracted position; and means for releasing the gun to permit it to return to battery under the action of its recuperator.

Referring to the drawings by numerals of reference:

I prefer to provide a suitable frame 10, the upper surface 11 of which may be inclined as shown in Fig. 1. Secured to the forward end of the frame and upon its upper surface are spaced apart blocks 12 for the reception of the trunnions 13 of the gun cradle 14 in which is slidably mounted the gun 15. Brackets 16 may be provided beneath the top surface and in position to hold a supporting member 17 which engages the cradle at the usual location of its elevating mechanism and serves to support the cradle in proper relation to the top surface.

Any convenient mechanism may be used for the purpose of retracting the gun, that herein shown being by way of illustration.

I provide at the rear of the frame a transverse shaft 18 which is supported in the side members of the frame and upon which a pulley 19 is rotatable and adapted to receive power from any convenient source for the purpose of driving the mechanism. Mounted on the shaft 18, adjacent the pulley 19, is a hollow shaft or sleeve 20 to which is keyed a drum 21 and on the same sleeve or shaft is likewise mounted a pinion 22 meshing with a spur gear 23 affixed to a hollow shaft 24 which rotates on a spindle 25 suitably supported in the frame. The hollow shaft 24 has formed on one end thereof a pinion 26 which meshes with a gear 27 formed on one portion of a drum 28, which drum is provided with the spaced apart annular grooves 29.

For the purpose of controlling the mechanism just described I may provide a shaft 30 which extends transversely of the frame and which is adapted to be rocked through a hand lever 31 which is affixed to an extending end thereof. On the opposite end of the shaft 30 is formed a segment of a bevel gear 32 which meshes with a bevel gear 33 secured on one end of a shaft 34, which shaft is journalled on the side of the frame and extends at right angles to the shaft 30. The shaft 34 is provided with cranks 35 engaging ends of the connecting rods 36 the other ends of which engage the trunnions 37 of a collar 38 secured in an annular groove formed in the conical member 39 which member is slidable longitudinally of the shaft 18. The conical member 39, when the shaft 34 is rocked through rocking the shaft 30, is moved inwardly along the shaft 18 and thrusts under the end 40 of the crank arm 41 which is secured to a pin 42 journaled in the pulley 19 and having, at its opposite end, a cross head, 43 to which are secured the ends of a clutch band 44 which is adapted to be drawn about the drum 21 and bind the same to the pulley 19 to cause the parts to operate with the rotation of said pulley. When the conical member 39 is retracted to its normal position the crank arm 41 is drawn to rock the pin 42 and loosen the clutch band 44 by means of a resilient element, such as coiled spring 45 one end of which is attached to a lug laterally from the arm 41 and the other end of which may be attached to a lug carried on the pulley 19.

In order that the members may be held against movement in any desired position, suitable braking mechanism is provided, that herein shown, consisting of a crank arm 46 which is secured to the shaft 30 and is connected by link 47 to a brake band 48 which also engages the drum 21. As will be readily seen from the drawing the brake band 48 is brought into operation to braking the drum 21 when the shaft 30 is rocked to a sufficient extent in a direction opposite to that employed for throwing the clutch into action.

The hand lever 31, through which the shaft is rocked, may be conveniently provided with a segmental rack 49 engaged by a pawl 50 which serves to hold the lever in any set position.

The grooves 29 of the drum 28 are joined by a curved groove 51 in which is positioned the loop of the cable 52 which may be held therein, conveniently, by a plate 53. The ends of the cable 52 are turned back upon themselves to form eyes 54 to fit over the hooks 55 formed on a link 56 which is pivotally connected to a block 57 slidable in a channel or guideway 58 which is secured to and extends for a short distance longitudinally of the upper surface of the frame. The block 57 is formed, at its forward end, with an upwardly extending lug 59 and, connected to the block is a swinging jaw 60 having a hooked end 61. Pivotally connected to the swinging jaw is a cam lever 62 which may be held locked in one position by means of a sliding pin 63 mounted in an aperture in the jaw 60 and engageable in an aperture formed in the cam lever 62. A link 64 is provided with a hooked end 65 formed for engagement with the hooked end of the swinging jaw 60 and the lug 59 of the block, the other end of the link 64 being formed to straddle the recoil lug of a gun and apertured to receive a coupling pin to connect the link to the gun.

In order to insure a cut off of the power retracting the gun, should the attendant neglect to throw the lever 31 at the proper time, an arm 66 is mounted on the shaft 30 in the path of the block 57 and is in position to be struck by said block to lock the shaft 30 and release the clutch member 39 thereby cutting off the power.

In practice the gun and its cradle are mounted on the frame, as heretofore described, and the link 64 is connected to the recoil lug of the gun, the hooked end thereof being held between the lug of the block and swinging jaw. The lever 31 is then thrust counter clockwise, as viewed in Fig. 1, rocking the shaft 30 and shaft 34 to thrust the cone member 39 along the shaft 18 and swing the crank arm 41 to actuate the clutch 44, which will cause the hollow shaft 20 to rotate with the drum 21 and pulley 19. Rotation of the hollow shaft 20 will cause, through pinion 22, spur gear 23, pinion 26 and gear 27, rotation of the drum 28. Rotation of the drum will wind up the cable 52 drawing the block 57 and the gun rearwardly down the slideway 58 to any desired position. When the gun has been retracted to the desired extent the lever 31 is thrown clockwise thereby releasing the clutch and bringing into action the brake band 48, which will hold the members against movement.

To release the gun for the purpose of ascertaining the rapidity of counter recoil the pin 63 is drawn upwardly from engagement with the cam lever 62 and the lever swung outwardly thereby swinging the jaw 60 from engagement with the end 65 of the link 64 which releases the gun to movement under the action of the recuperator.

It will be noted that the block, swinging the jaw, and cam lever are so constructed that the link 64 is released therefrom without side thrust upon the link tending to move the link out of proper alinement.

What I claim is:

1. A testing device, including a supporting frame, means carried by the frame for mounting a gun and its cradle thereon, a pulley mounted in the frame and normally running free, a drum mounted in the frame, gearing betwen the pulley and drum, a clutch for throwing the pulley in and out of gear, a brake for stopping and holding gear and drum against movement, means for selectively operating the clutch and brake, a cable carried by the drum, a block secured to the cable, a slideway in the frame in which said block reciprocates, a latch associated with the block, a cam lever for opening the latch and a link engageable by the latch and attachable to a gun.

2. A gun testing device, including a support for a gun and its cradle, a drum connected to the support, means for rotating the drum, means for holding the drum against rotation, a cable connected to the drum and means carried by the cable for attaching the cable to the gun and releasing the cable from the gun while the gun is in retracted position.

3. A gun testing device, including a support for a gun and its cradle, a drum connected to the support, means for rotating the drum, means for holding the drum against rotation, means for selectively operating the drum rotating or drum holding means, a cable connected to the drum and means carried by the cable for releasably attaching the cable to the gun.

4. A gun testing device, including a support for a gun and its cradle, means connected to the support for retracting the gun, means for stopping and holding the gun retracting means to hold the gun at any desired position of retraction and means for releasing the gun from the gun retracting means.

5. A gun testing device, including a support for a gun and its cradle, gun retracting means carried by the support and means for releasing the gun from the gun retracting means while the gun is in retracted position.

WILLIAM C. PALMER.